United States Patent [19]
Divigard

[11] 3,768,373
[45] Oct. 30, 1973

[54] LINEARIZED PRESSURE GAIN MODULE
[75] Inventor: Albert J. Divigard, Waterbury, Conn.
[73] Assignee: Chandler Evans Inc., West Hartford, Conn.
[22] Filed: Aug. 28, 1972
[21] Appl. No.: 284,236

[52] U.S. Cl. .................................... 91/417, 91/459
[51] Int. Cl. ...................... F15b 15/17, F15b 13/44
[58] Field of Search .................. 91/47, 417, 363 A, 91/363 R, 361, 359

[56] References Cited
UNITED STATES PATENTS
| | | |
|---|---|---|
| 3,430,536 | 3/1969 | Pelrich .................................. 91/47 |
| 3,516,331 | 6/1970 | Pelrich et al. ........................... 91/47 |
| 3,521,535 | 7/1970 | Pelrich .................................. 91/47 |
| 3,664,234 | 5/1972 | Simons et al. ..................... 91/363 R |

Primary Examiner—Paul E. Maslousky
Attorney—Radford W. Luther et al.

[57] ABSTRACT

An open loop, time modulated control system has a circuit to shape a carrier wave for improving linearity between the command signal and the output torque of the system.

6 Claims, 12 Drawing Figures

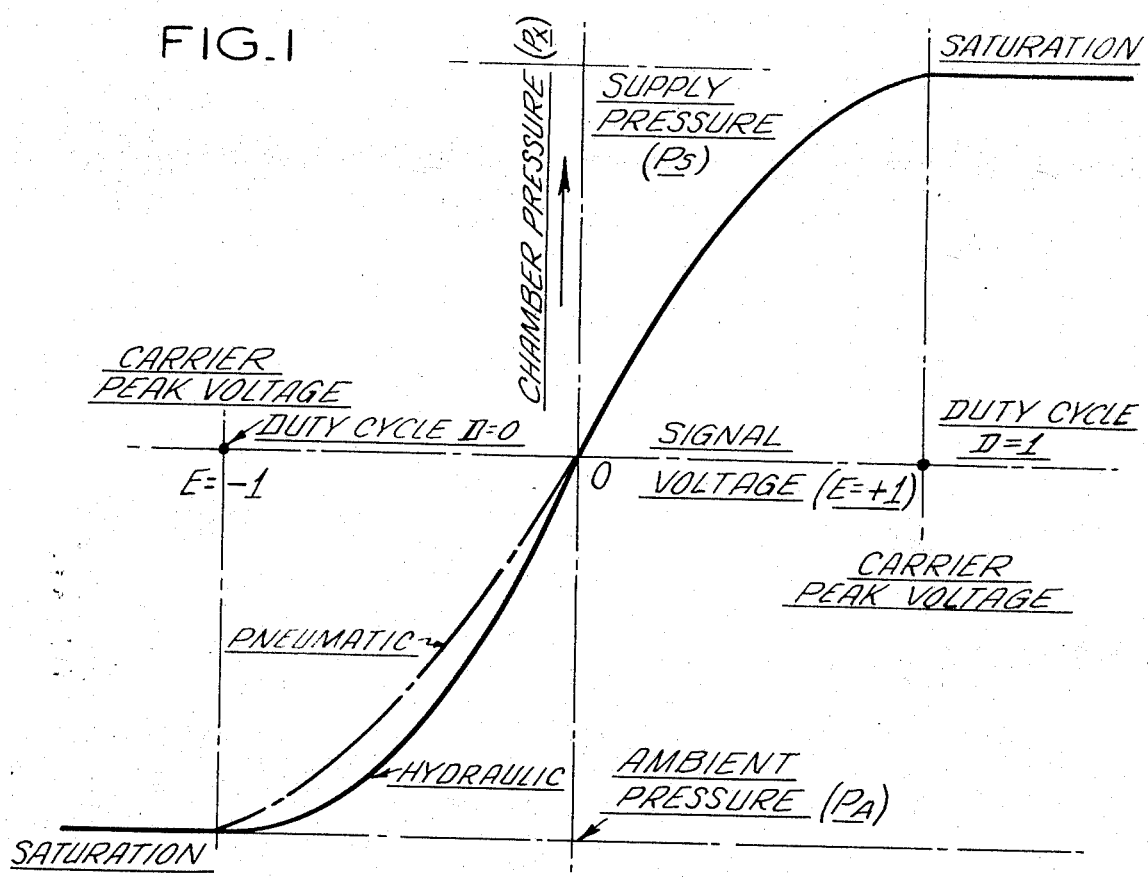
FIG.1
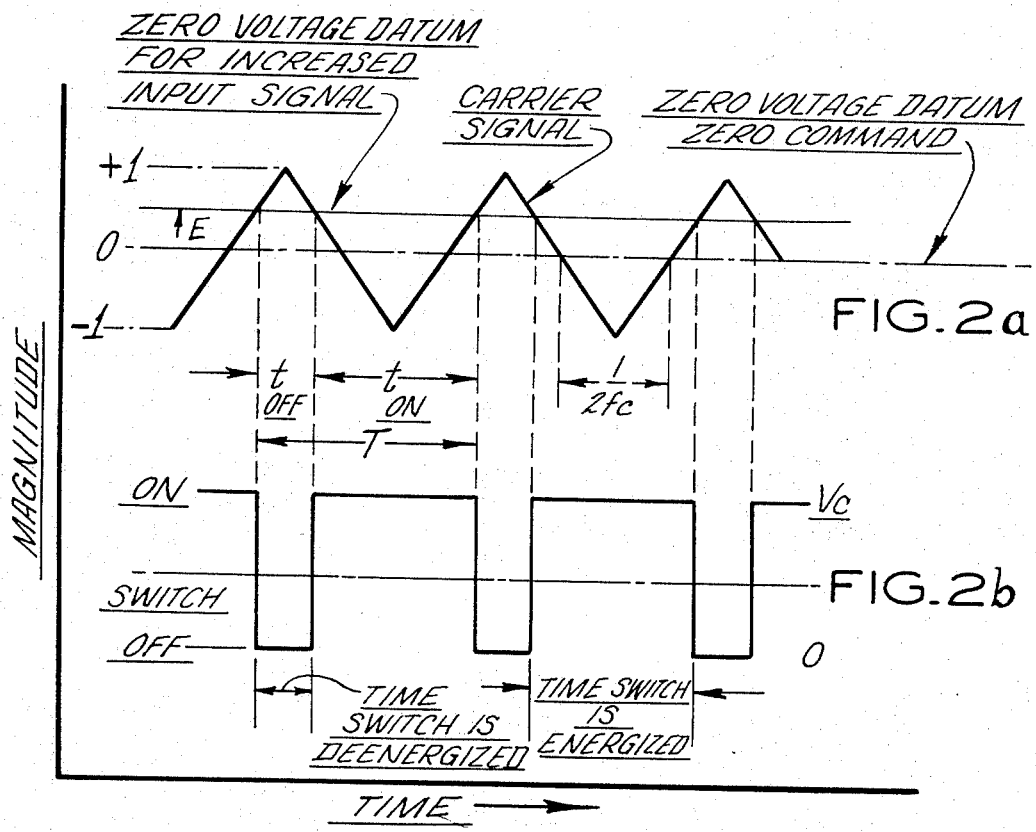
FIG.2a
FIG.2b

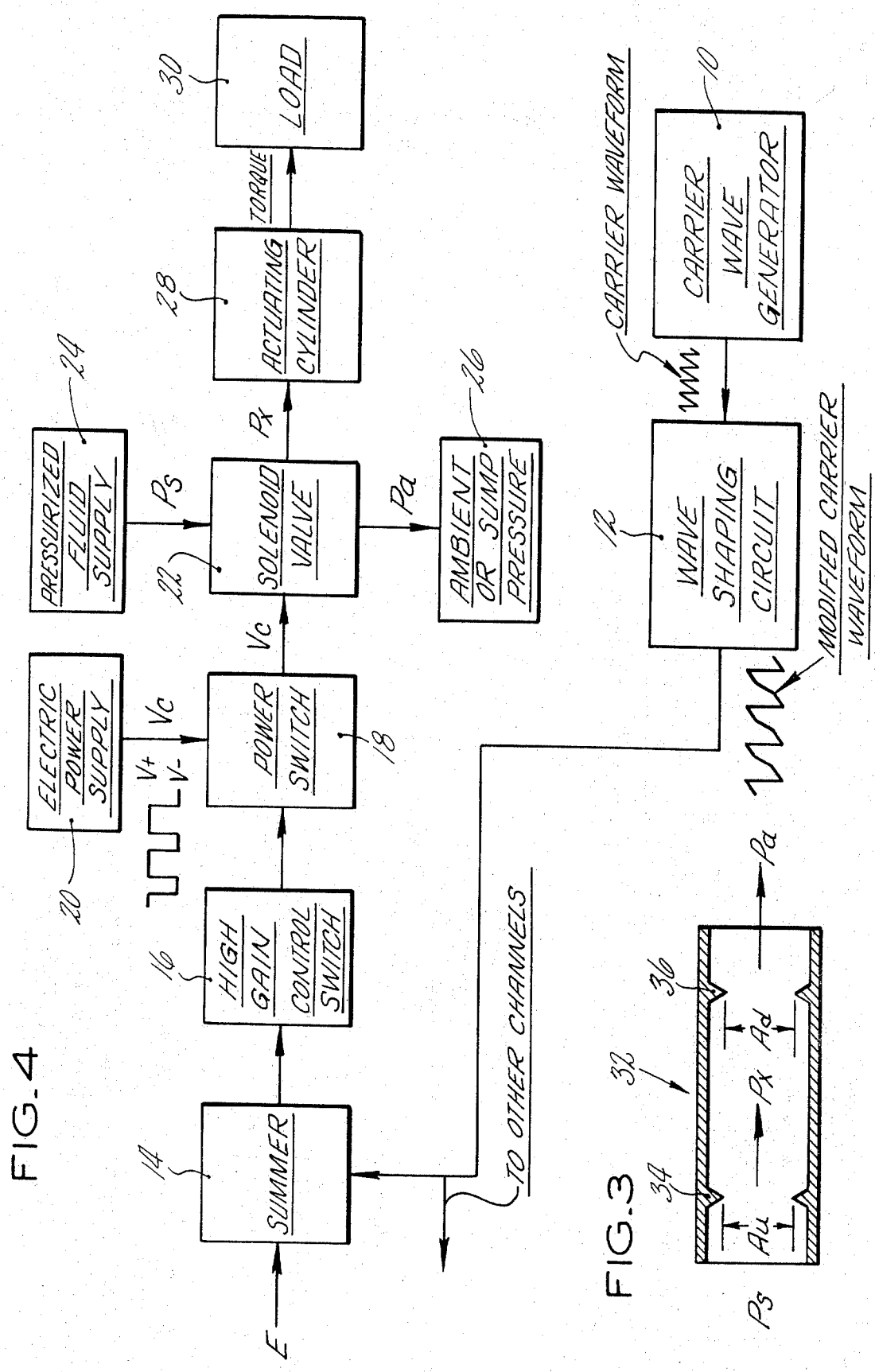

LINEARIZED PRESSURE GAIN MODULE

BACKGROUND OF THE INVENTION

This invention relates to time modulated control system.

The pressure gain characteristic in a time modulated system, as exemplified by those shown in U.S. Pat. Nos. 3,430,536 and 3,516,331, is inherently non-linear. However, as discussed in the aforementioned patents, there is a substantially proportional relationship between the command signal and the output pressure within the design limits of the system. In systems such as those shown in the aforementioned patents, in order to increase the limits of available output pressure without sacrificing substantial proportionality between the output pressure and the input command signal, an obvious solution is to increase the supply pressure. However, such an increase in supply pressure is liable to entail a weight and volume penalty which may not be permissible in a particular application. Another solution is to provide pressure feedback devices which convert the output or chamber pressure into an electrical signal which is summed with the input command signal to generate an error signal. Manifestly, such pressure transducers are relatively expensive and thereby increase the cost of a time modulated system.

SUMMARY OF THE INVENTION

The invention provides a means for shaping a carrier signal, which would typically be triangular, sawtooth, or sinusoidal, so as to accord greater linearity to the relationship between the chamber or controlled pressure and the command signal, particularly at the extremes of such a relationship. The invention generally linearizes the relationship between chamber pressure and the input command signal without the imposition of an unacceptable weight and volume penalty upon the system, and without a significant increase in system cost.

Accordingly, it is a primary object of the invention to provide an open loop, time modulated control system have a means to linearize the pressure gain characteristic thereof.

This and other objects of the invention will become more readily apparent from the following detailed description taken in conjunction with the accompanying drawings.

BRIEF DESCRIPTION OF THE DRAWINGS

FIG. 1 is a graph showing the pressure gain characteristics of time modulated control mechanisms which are respectively pneumatically and hydraulically actuated.

FIG. 2a is a schematic representation of a triangular carrier wave prior to shaping in accordance with the invention.

FIG. 2b is a schematic representation showing the period during which a control valve would be energized by the wave of FIG. 2a for a given command input signal.

FIG. 3 is a schematic representation of a conduit incorporating two restrictions.

FIG. 4 is a block diagram of a time modulated, open loop control system which includes a carrier wave shaping means according to the invention.

DESCRIPTION OF PREFERRED EMBODIMENTS

Figure 5:
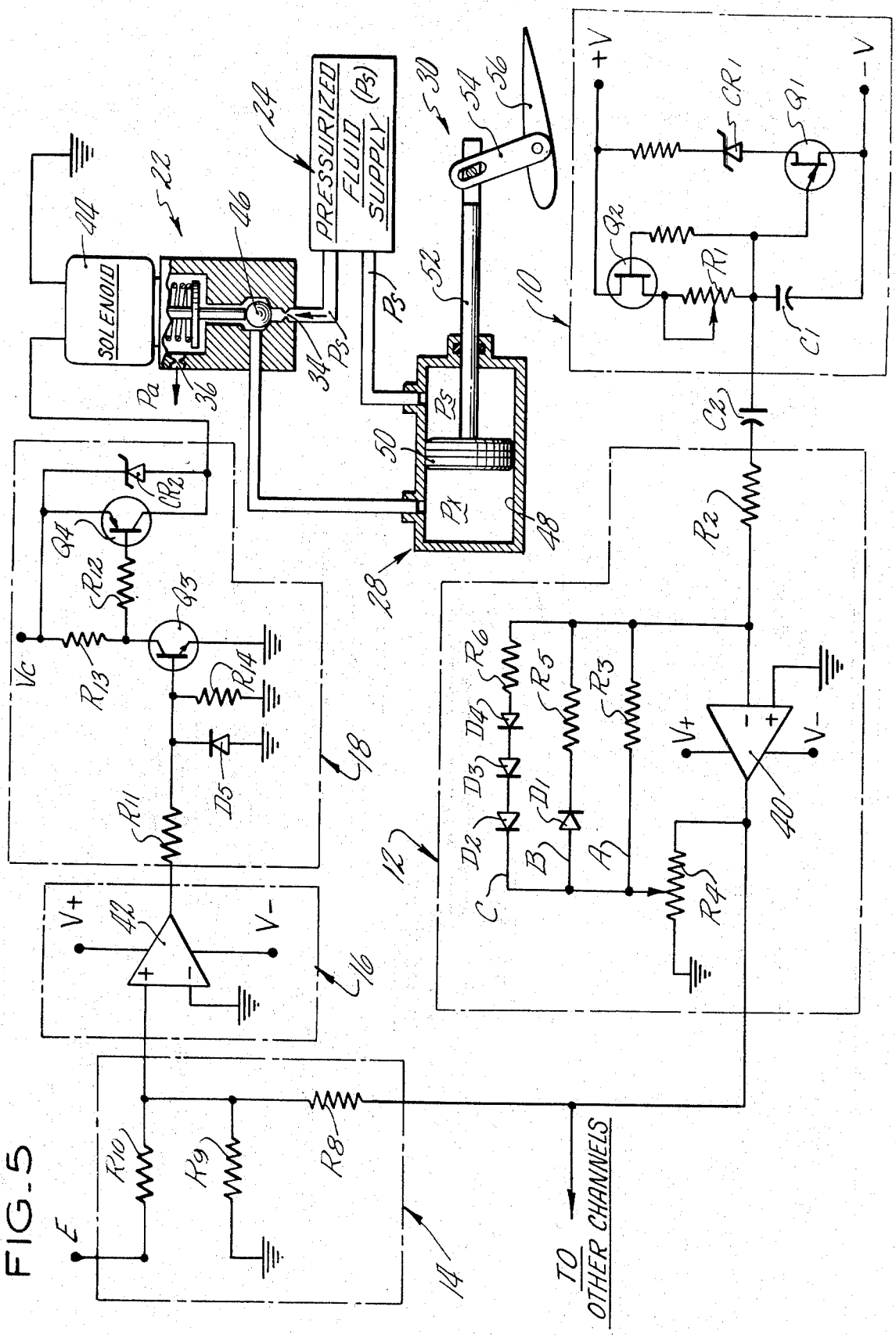
FIG. 5 is a schematic view of the system depicted in block form in FIG. 4.

Referring now to FIG. 1, a plot of signal voltage E versus chamber pressure is illustrated for a typical hydraulically actuated control mechanism, such as illustrated in U.S. Pat. No. 3,516,331, and for a typical pneumatically actuated control mechanism, such as illustrated in U.S. Pat. No. 3,430,536. It will be noted from FIG. 1 that a high degree of proportionality exists between the signal voltage and the chamber or controlled pressure for an intermediate pressure range. However, it will also be noted from FIG. 1 that this substantially proportional relationship deteriorates as the chamber pressure approaches the supply pressure and the ambient or sump pressure. Obviously, it would be profitable to linearize the upper and lower portions of the pressure gain curve of FIG. 1 so that chamber pressures $P_x$ close to the supply pressure $P_s$ and the ambient pressure $P_a$ could be generated while maintaining a considerable extent of proportionality.

Referring to FIGS. 2a and 2b, the control mechanisms of the aforementioned patents are adapted to utilize a carrier signal which is summed with a command signal voltage E to vary the time period during which the valve is energized, this being a function of the location of the zero voltage datum. With reference to FIG. 2b, a switching device, as discussed in the aforementioned patents, applies current to the valves of the respective control mechanisms in accordance with the magnitude of the command signal E. It has been found that by shaping the upper and lower portions of the carrier wave, which may be triangular, as illustrated, the upper and lower portions of the pressure gain curve can be linearized or straightened, as is explained more fully hereinafter.

A typical control system, incorporating the present invention, is illustrated in block form in FIG. 4. A carrier wave generator 10 generates a periodic sawtooth carrier wave form which is applied to a wave shaping circuit 12 for modifying the wave form in a manner explained in detail hereinafter. The modified carrier wave form is directed to a summer 14 which sums the carrier wave with an input command signal E, thereby shifting the zero voltage datum. The output of the summer 14 is directed to a threshold sensing, high gain, control switch 16 which generates a square wave, similar to that shown in FIG. 2b, to actuate a power switch 18. Power switch 18, which is connected to a source of electric power supply 20, furnishes power to a solenoid valve 22. A pressurized fluid supply 24 furnishes the solenoid valve with pressurized fluid. The solenoid valve 22 is also connected to a source of ambient or sump pressure 26. The output or controlled pressure $P_x$, generated by the solenoid valve, is communicated to an actuating cylinder 28 which applies a torque, corresponding to the pressure therein to a load 30.

FIG. 3 affords a convenient representation of a time modulated valve. In the model of FIG. 3, a conduit 32 is shown as having orifices 34 and 36 with similar coefficients and respective areas $Au$ and $Ad$. The pressure $Ps$ represents the supply pressure at the inlet of the conduit and the pressure $Pa$ represents the pressure at the outlet of the conduit, the ambient pressure or sump pressure. The pressure $Px$ intermediate the orifices 34 and 36 represents the output or controlled pressure applied to the chamber of the actuating cylinder 28, this latter pressure being determinative of the torque applied to the load 30.

Referring to FIG. 4 in conjunction with FIG. 2a, when current is supplied to solenoid valve 22 during the time period designated $t_{on}$ in FIG. 2a, orifice 34 is open, and conversely, orifice 36 is closed. In like manner, upon removal of the impressed potential from solenoid valve 22, orifice 34 is closed and orifice 36 is open. By definition, the duty cycle D is the ratio of the time that current is supplied to solenoid 22 to the period T of the carrier wave shown in FIG. 2a. The duty cycle may be expressed by the following equation:

$$D = t_{on}/(t_{off} + t_{on}) = (t_{on}/T) \quad (1)$$

Obviously, the output pressure Px of the solenoid valve 22 increases with an increase in the duty cycle $D$.

With reference to FIG. 3, it can be shown that under the typical design conditions wherein $Ps >> Pa$, the controlled pressure $Px$ to the supply pressure $Ps$ can be expressed by the following equation when the working fluid is hydraulic:

$$(Px/Ps) = 1/1 + [(1-D/D)\alpha]^2 \quad (2)$$

wherein:
$\alpha = Ad/Au$

For the case of a pneumatic working fluid, it can be shown that for the condition wherein:

$$(Px/Ps) \leq 0.5, \quad (3)$$

the controlled pressure to the supply pressure ratio can be expressed as follows:

$$(Px/Ps) = (D/1-D)\, 1/\alpha \quad (4)$$

But for the situation wherein:

$$(Px/Ps) \geq 0.5, \quad (5)$$

the following approximate relationship controls:

$$\frac{Px}{Ps} = \frac{\left[\left(\frac{2}{\pi}\right)\left(\frac{D}{1-D}\right)\right]^2}{1+\left[\left(\frac{2}{\pi}\right)\left(\frac{D}{1-D}\right)\right]^2} \quad (6)$$

Typically, it is desirable in a single valve design to have the control pressure to supply pressure ratio equal to 0.5 when the duty cycle $D$ equals 0.5. From the above equations, it can be shown that for this condition to be valid, in the hydraulic case, the orifice area ratio ($\alpha$) must equal 1, and in the pneumatic case, the orifice area ratio ($\alpha$) must equal 2. Hence, in a typical hydraulic control system, the following equation governs:

$$(Px/Ps) = D^2/(2D^2 - 2D + 1) \quad (7)$$

The above equation is also valid for a pneumatic system wherein the pressure ratio ($Px/Ps$) is greater than or equal to 0.5 because $\alpha$, the orifice area ratio, is set to the value of 2 in order to have the ratio ($Px/Ps$) equal to 0.5 when $D$ is 0.5. However, in a pneumatic system wherein the pressure ratio is less than or equal to 0.5, the pressure ratio is defined by the following equation:

$$(Px/Ps) = \tfrac{1}{2}\,(D/1-D) \quad (8)$$

It should be apparent from the above equations and from FIG. 1 that an increase in the rate of change of duty cycle $D$ with signal voltage E for the outer segments of the gain curve will effect a greater linearity between signal voltage E and chamber pressure $Px$ for both pneumatic and hydraulic systems. Although the gain curve in FIG. 1 is computed on the basis of a triangular carrier signal or a sawtooth carrier signal, it will be appreciated that the gain curve for a sinusoidal carrier signal will not deviate significantly from that shown.

A preferred means for shaping the carrier signal is shown in FIG. 5. The carrier wave generator 10, as depicted in FIG. 5, is a well-known unijunction oscillator, incorporating a unijunction transistor $Q_1$ which affects a periodic charging and discharging of a capacitor $C_1$. The time constant of the circuit, and thus the output frequency of the carrier wave generator, may be adjusted by means of a potentiometer $R_1$ in series connection with capacitor $C_1$ and a field effect or bipolar transistor $Q_2$ which provides a constant current. In order to maintain a constant output frequency with variations in temperature, the unijunction transistor $Q_1$ is coupled to the positive voltage terminal +V by means of a zener diode $CR_1$. The sawtooth voltage output of the carrier wave generator 10 is directed to the wave shaping circuit 12 through a DC blocking capacitor $C_2$.

A preferred embodiment of the wave shaping circuit 12 consists essentially of an operational amplifier and a means to change the gain of the amplifier such that the carrier wave emanating from carrier wave generator 10 is appropriately shaped so as to somewhat linearize the pressure gain curve of FIG. 1. Circuit 12 comprises a high-gain amplifier 40 having an input impedance $R_2$ and an external feedback circuit incorporating first, second and third parallel paths, designated A, B and C, respectively. The gain of the operational amplifier 12 for an intermediate range of voltages, bounded by a selected negative output voltage and a selected positive output voltage, is determined by the resistance presented by resistor $R_3$ in path A and the resistance presented by potentiometer $R_4$ in conjunction with $R_2$. Feedback path B comprises a diode $D_1$ and the resistance $R_5$ in series connection. When the output voltage of amplifier 12 exceeds a predetermined positive value, which is dictated by the characteristics of diode $D_1$, path B will assume a forward conduction state, thereby changing the gain of the amplifier for voltages above this positive threshold value. Similarly, when the output voltage of the amplifier 12 attains a predetermined negative value, Path C, which incorporates diodes $D_2$, $D_3$, and $D_4$ and resistance $R_6$, will enter into the forward conduction state, thereby varying the gain of the amplifier.

Obviously, the number and characteristics of the diodes in the paths B and C is predicated upon the desired threshold voltages in which a shift in amplifier gain is desired. Also, it will be noted from FIG. 5 that the forward conduction states of paths B and C are mutually exclusive because of the opposite orientation of the respective diodes. It will be appreciated that for negative going output voltages, the new gain of amplifier 12 is determined by the resistance offered by parallel resistances $R_3$ and $R_5$ and the threshold voltage required for diode $D_1$ to go into forward conduction. Hence, the new gain can be expressed as a constant plus the threshold voltage required for $D_1$ to go into forward conduction. Similarly, with path C in a forward conduction state, as beget by a voltage greater than a predetermined threshold output voltage, the new gain is determined by the effective resistance offered by parallel resistances $R_3$ and $R_6$. Hence, this latter new gain may be expressed as another constant plus the threshold voltage required for the series connected diodes $D_2$, $D_3$ and $D_4$ to go into forward conduction.

Figure 5A:
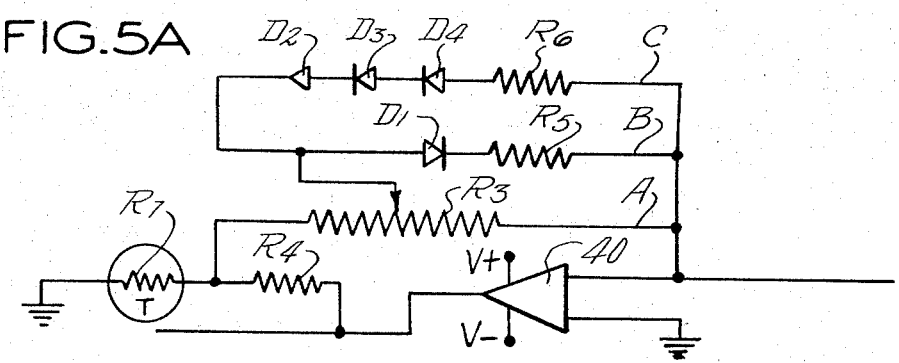
FIG. 5a is a schematic diagram of an alternative form of carrier wave shaping means.

As shown in FIG. 5a, the amplifier 12 may be modified by converting resistor $R_3$ to a potentiometer having its wiper connected intermediate the diodes $D_1$ and $D_2$, and by converting $R_4$ to a fixed resistance and further providing a temperature sensitive resistance $R_7$ connected to ground and the junction of $R_3$ and $R_4$.

Obviously, the gain of the amplifier 12 can be varied by other means other than those specifically illustrated. For example, the feedback circuit could incorporate switching elements, such as transistors, to alter the amplifier gain in a similar manner. It should also be apparent that any number of feedback paths may be utilized to provide a corresponding number of gain variations, the number of gain variations desired being a matter of design choice. The invention is also not to be construed as being limited to the particular wave shaping means illustrated, that is, altering the feedback characteristics of an amplifier.

The output of amplifier 12, that is, the shaped carrier signal, is applied to the summer 14 which includes a resistance bridge comprising resistances $R_8$, $R_9$ and $R_{10}$. Resistances $R_8$ and $R_{10}$ receive the modified carrier wave and the input command signal, respectively, the resistance $R_9$ being connected to ground and to a point in the summer circuit intermediate resistances $R_8$ and $R_{10}$. The output of the summer 14 is directed to the high gain control switch 16 which comprises a high gain amplifier 42, which acts as a switch to generate equal duration V+ or V− voltage pulses in the case of a zero command signal E. In such a case, the positive and negative going portions of the carrier signal share equal portions of the period T and therefore the switch 16 generates V+ and V− pulses which each occupy one-half of the period T. However, when a command signal E is applied to the summer 14, the zero voltage datum of the carrier signal is shifted, thereby producing a variation in the times in which V+ and V− signals are generated. For example, should a negative command signal be generated which is less than the peak magnitude of the carrier signal the length of the V+ pulses generated by switch 16 will be shorter in duration than the V− pulses. Conversely, the application of a positive command voltage E shifts the datum of the carrier signal such that the V+ pulses are longer in duration than the V− pulses. When the input command signal E is a voltage which is either equal to or greater than the peak positive and negative voltage values of the carrier signal, the switch 16 will respectively produce a constant positive voltage and a constant negative voltage, V+ and V−.

The voltage signals from the switch 16 are applied to the power switch 18. Power switch 18 comprises an input resistance $R_{11}$ and an NPN transistor $Q_3$ having its emitter connected to ground and its base connected to $R_{11}$. Power switch 18 also comprises a PNP transistor $Q_4$ having its base connected to the collector of transistor $Q_3$ via resistance $R_{12}$, the emitter of transistor $Q_4$ being connected to the electric power supply 20 which supplies a voltage $Vc$. The collector of transistor $Q_3$ is also connected to the power supply 20 by means of a transistor $R_{13}$. It should be apparent that positive going pulses generated by switch 16 will produce a current in the base of transistor $Q_3$ which will cause a voltage drop across resistance $R_{13}$ as $Q_3$ is switched on, thereby producing a base current in transistor $Q_4$ which turns on transistor $Q_4$ so that the power supply is connected to the solenoid 44 of solenoid valve 22. In addition, a grounded diode $D_5$ is connected between resistance $R_{11}$ and the base of transistor $Q_3$ to prevent the base of the transistor $Q_3$ from being exposed to V− signals which could otherwise engender damage. A resistance $R_{14}$ is similarly connected to the base of transistor $Q_3$ to limit the base current in $Q_3$ during the positive going pulses V+ of switch 16. A zener diode $CR_2$ is connected in parallel with transistor $Q_4$ to prevent the application of a large voltage across the emitter and collector of transistor $Q_4$ when the switch 18 is deenergized by the application of a V− pulse. Zener diode $CR_2$ also aids in decay of the current in power switch 18.

With the continued reference to FIG. 5, solenoid valve 22 comprises a ball 46 which seats as illustrated to choke orifice 34 when the solenoid 44 is deenergized, thereby opening a path of fluid communication between the chamber 48 of actuating cylinder 28 and ambient pressure $Pa$ via orifice 36. Conversely, an energization of solenoid 44 causes the ball 46 to seat so as to choke orifice 36, thereby providing communication between the chamber 48 and the supply pressure $Ps$ via orifice 34.

Cylinder 28 includes a piston 50 having an area exposed to the control pressure $Px$ which is preferably two times that of the area exposed to supply pressure $Ps$. Piston 50 is connected to a shaft 52 which, in turn, is connected to the load 30, shown as constituted by a link 54 and a fin 56. Fin 56 would serve as a control service for the guidance of a missile or similar device, and thus would exhibit a polar moment of inertia and an aerodynamic spring rate.

It should be noted that the amplifiers shown in FIGS. 5 and 5a are for use in pneumatic systems, wherein the pressure gain curve is unsymmetrical. In a case of a hydraulic system, wherein the pressure gain curve is symmetrical, the parallel paths B and C would be made identical in that the threshold voltages for forward conduction and the respective resistances would be equal.

Figure 6:
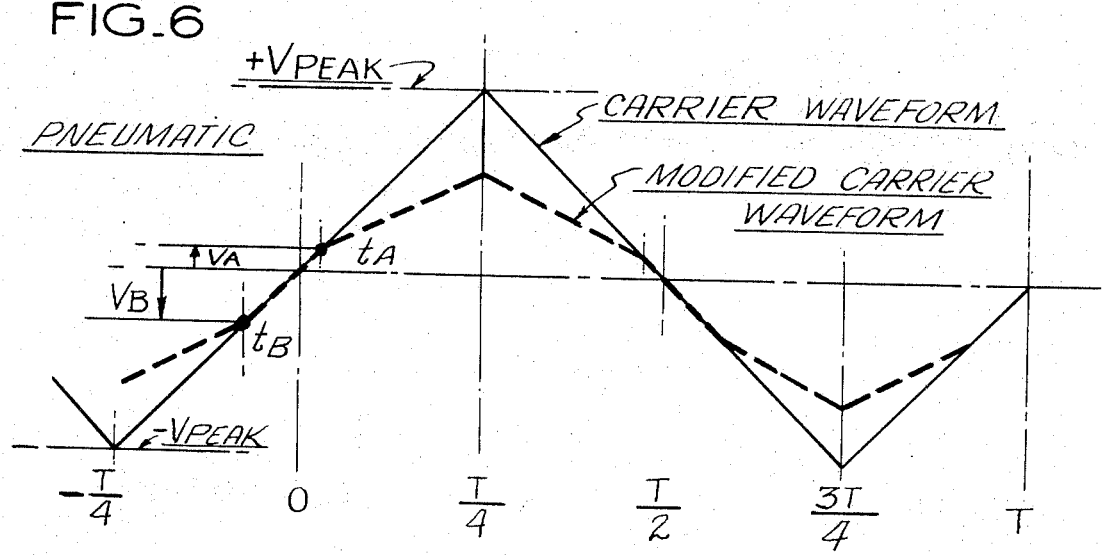
FIGS. 6 and 7 respectively depict typical modified carrier wave forms for pneumatically and hydraulically actuated control mechanisms according to the invention.
Figure 7:
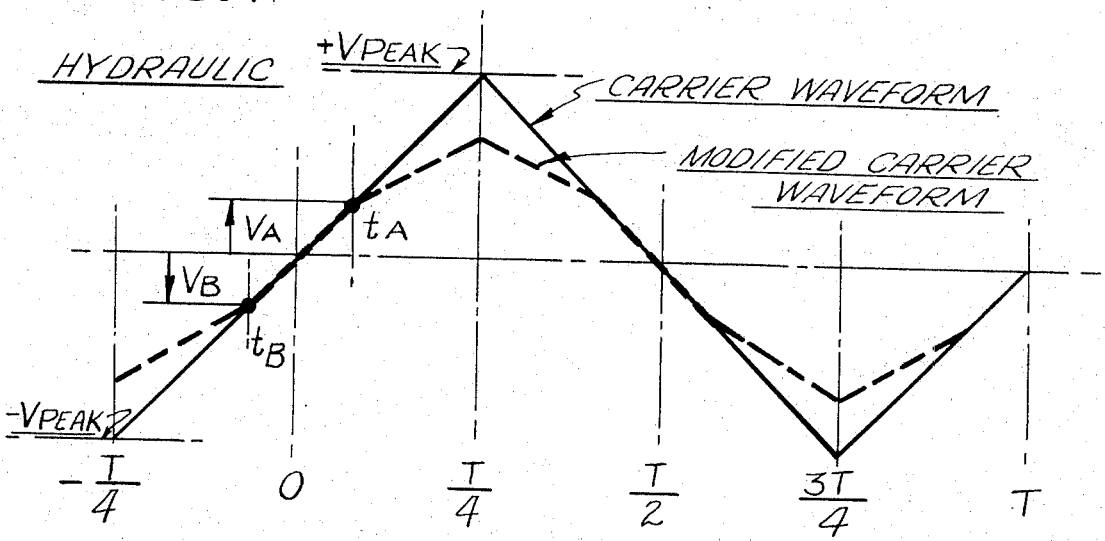
Figure 8:
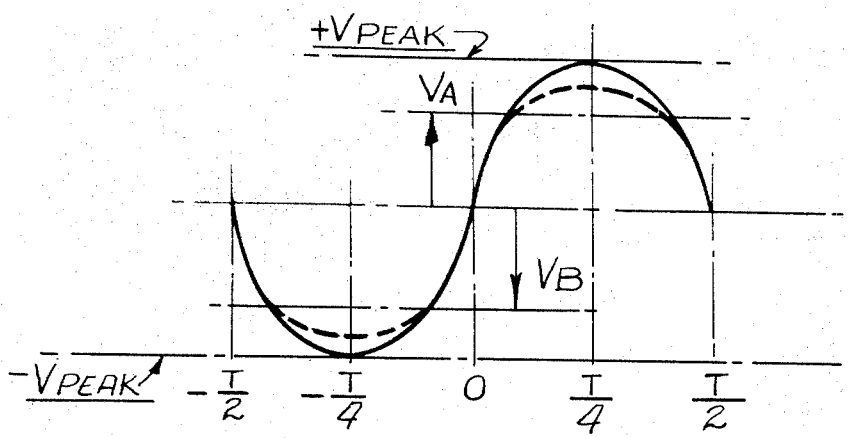
FIG. 8 depicts a sinusoidal carrier wave form as shaped in accordance with the invention.

FIGS. 6 and 7 illustrate the shape of a carrier wave by means according to the invention to produce a modified carrier waveform. For purposes of illustration, the unmodified carrier waveform of FIGS. 6 and 7 is shown as a triangular wave, whereas in the illustrated embodiment, the unmodified carrier wave would be a sawtooth. In addition, FIG. 8 illustrates the shaping of a sinusoidal wave by means according to the invention.

It has been found that a carrier wave, whether it be sinusoidal, triangular or sawtoothed, shaped in accordance with the equations presented in the following table yields a pressure gain curve having considerable linearity. The following symbols shown in FIGS. 6–8 and presented in the table have the indicated meanings:

$T$ — period of waveform;
$K$ — unmodified carrier waveform (e.g., $\sin(wt)/T$, $t/T$, etc.);
$t$ — time;
$ta$ — time at positive break point of carrier;
$tb$ — time at negative break point of carrier;
$e(t)$ — normalized waveform of carrier as a function of time;
$V_B$ — amplitude of break point (negative carrier wave side);
$V_A$ — amplitude of break point (positive carrier wave side);
$V$peak — peak amplitude of waveform.

| Time | Pneumatic system | Hydraulic system |
| --- | --- | --- |
| $-T/4$ to $-tb$ | $e(t)=K[-0.3+2/T\ (t+tb)]$ where: $tb=3/10\ (T/4)$ | $e(t)=K[-0.3+2/T\ (t+tb)]$ where: $tb=3/10\ (T/4)$ |
| $-tb$ to $t/a$ | $e(t)=K[4/T\ t]$ where: $t/a=1/10\ (T/4)$ $tb=3/10\ (T/4)$ | $e(t)=K[4/T\ t]$ where: $ta=3/10\ (T/4)$ $tb=3/10\ (T/4)$ |
| $ta$ to $T/4$ | $e(t)=K[0.1+2/T\ (t-t/a)]$ where: $ta=1/10\ (T/4)$ | $e(t)=K[0.3+2/T\ (t-t/a)]$ where: $ta=3/10\ (T/4)$ |

Figure 9:
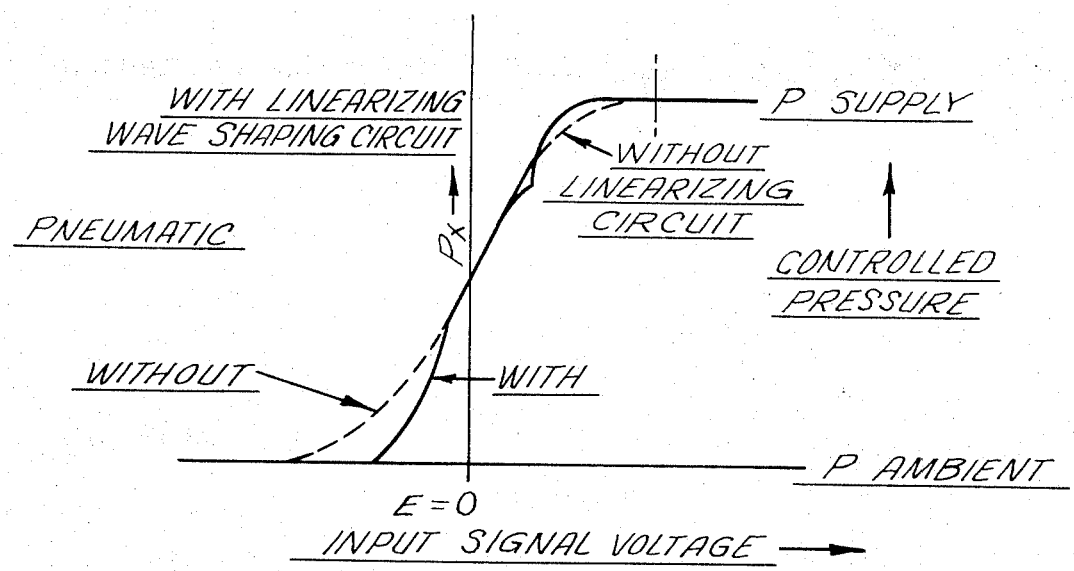
FIGS. 9 and 10 depict the linearization of the relationship between input signal voltage and chamber pressure for pneumatic and hydraulic systems according to the invention.
Figure 10:
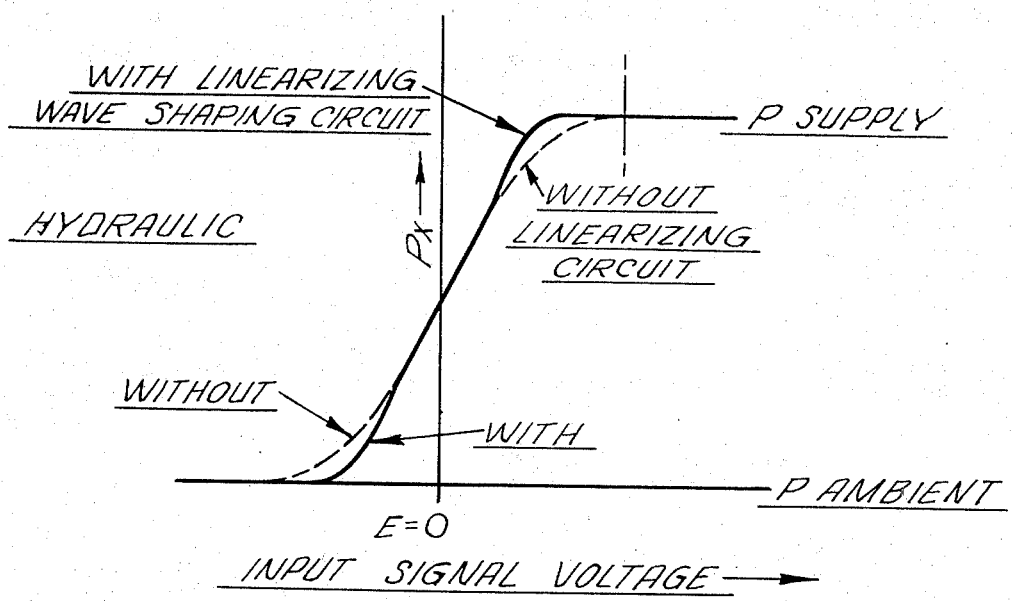

Systems designed in accordance with the above table, that is, systems having diode characteristics and resistances selected to conform to the equations in the table, produce pneumatic and hydraulic pressure gain curves, as shown in FIGS. 9 and 10 respectively. From the curves of FIGS. 9 and 10, it will be noted that a decided improvement in linearity has been achieved by only a minor change in the control circuitry, the gain curves for unmodified carrier waves being illustrated by dashed lines.

Obviously, many modifications are possible in light of the above teachings without departing from the scope and spirit of the invention as defined in the subjoined claims:

I claim:

1. An improved time modulated control mechanism of the type having:
   a fluid controlled actuator;
   a valve, responsive to first and second signals, operatively connected to the actuator to supply a controlled fluid pressure thereto;
   a carrier wave generator for generating a carrier signal;
   means to sum the carrier signal and an input command signal for generating a summed carrier signal;
   switch means to generate the first signal when the summed carrier signal is on one side of a predetermined datum, and to generate the second signal when the summed carrier signal is on the other side of the datum, the respective first and second signal durations being determinative of the controlled fluid pressure; and wherein the improvement comprises:
   means to shape the carrier signal generated by the carrier wave generator so as to increase the rate of change of first signal duration with said command signal for at least one predetermined command signal range such that a more linear relationship between the command signal and the controlled pressure is effected.

2. The improved time modulated control mechanism of claim 1, wherein the shaping means comprises:
   an operational amplifier connected to the carrier wave generator; and
   means responsive to the output voltage of the amplifier to change the gain thereof.

3. The improved time modulated control mechanism of claim 1, wherein the shaping means comprises:
   a high gain amplifier;
   an input impedance, adapted to have the carrier signal applied thereto, connected to the input of the amplifier;
   a feedback circuit, having first and second parallel feedback paths, connected to the input and the output of the amplifier;
   a first impedance in the first path;
   a second impedance in the second path; and
   means to prevent a current flow in the second path until the output voltage exceeds a threshold value whereby the gain of the amplifier is changed for output voltages exceeding the threshold value.

4. The improved time modulated control mechanism of claim 3, wherein the current flow preventing means comprises:
   at least one diode in the second path in series connection with the second impedance.

5. The improved time modulated control mechanism of claim 4, wherein the feedback circuit further comprises:
   a third parallel feedback path;
   a third impedance in the third path; and
   at least one diode in the third path in series connection with the third impedance, the diode in the third path being opposite in orientation to the diode in the second path.

6. An improved method of time modulated operation of a solenoid positioned valve which is adapted to supply a controlled fluid pressure to an actuator, the improved method being of the type which comprises:
   generating a carrier signal;

summing the carrier signal with an input command signal to generate a summed carrier signal;

applying a voltage to the solenoid when the summed carrier signal is on one side of a predetermined voltage datum;

terminating the voltage when the carrier signal is on the other side of the voltage datum; and wherein the improvement comprises:

shaping the carrier signal so as to increase the rate of change of voltage duration with said command signal for at least one predetermined command signal range such that a more linear relationship between the command signal and the controlled pressure is effected.

* * * * *